(12) United States Patent
Miyahara et al.

(10) Patent No.: US 7,905,969 B2
(45) Date of Patent: Mar. 15, 2011

(54) FEEDING APPARATUS

(75) Inventors: Hiroshi Miyahara, Hiroshima-ken (JP);
Jiro Agawa, Hiroshima-ken (JP);
Makoto Tachibana, Hiroshima (JP);
Yoshinori Miyamoto, Hiroshima-ken (JP)

(73) Assignee: Mitsubishi Heavy Industries, Ltd. (JP)

( * ) Notice: Subject to any disclaimer, the term of this patent is extended or adjusted under 35 U.S.C. 154(b) by 237 days.

(21) Appl. No.: 12/257,600

(22) Filed: Oct. 24, 2008

(65) Prior Publication Data
US 2009/0242102 A1    Oct. 1, 2009

(30) Foreign Application Priority Data

Mar. 31, 2008    (JP) ................................. 2008-088968

(51) Int. Cl.
*B32B 41/00*    (2006.01)
(52) U.S. Cl. ........... 156/64; 156/117; 156/353; 156/354; 156/362; 156/363; 156/364; 156/405.1; 156/406.4
(58) Field of Classification Search .................... 156/64, 156/117, 353, 354, 362, 363, 364, 405.1, 156/406.4
See application file for complete search history.

(56) References Cited

U.S. PATENT DOCUMENTS

| 2,754,953 | A |   | 7/1956 | Groncy |
| 3,253,489 | A | * | 5/1966 | Phillips ............................ 83/88 |
| 3,428,510 | A | * | 2/1969 | Jones et al. ................... 156/406 |

FOREIGN PATENT DOCUMENTS

| EP | 0 434 404 | 6/1991 |
| EP | 0 958 913 | 11/1999 |
| EP | 1 095 761 | 5/2001 |
| JP | 04-305440 | 10/1992 |
| KR | 20-0261084 Y1 | 1/2002 |

OTHER PUBLICATIONS

European Search Report from 08167145.5-2307.
Office Action issued on the counterpart Korean Patent Application No. 10-2008-105585 on Aug. 27, 2010.

* cited by examiner

*Primary Examiner* — George R Koch, III
(74) *Attorney, Agent, or Firm* — Kanesaka Berner & Partners, LLP

(57) ABSTRACT

The feeding apparatus is provided with a first feeding section for feeding a long-formed sheet in the longitudinal direction of the sheet, a second feeding section for feeding the long-formed sheet delivered from the first feeding section in a direction intersecting obliquely with the feeding direction of the first feeding section and a control section for controlling the first feeding section and the second feeding section so that the second feeding section starts to operate before the leading end of the long-formed sheet delivered from the first feeding section is in contact with the second feeding section.

5 Claims, 4 Drawing Sheets

FEEDING APPARATUS

CROSS-REFERENCE TO RELATED APPLICATIONS

Priority is claimed on Japanese Patent Application No. 2008-88968 filed on Mar. 31, 2008, the content of which is incorporated herein by reference.

BACKGROUND OF THE INVENTION

1. Field of the Invention

The present invention relates to a feeding apparatus which is satisfactorily used in the production of rubber-coated steel cords usable as a carcass cord and a breaker cord of tires, for example.

2. Background Art

In facilities for producing a carcass cord and a breaker cord of tires, such a feeding apparatus provided with a first feeding section, a cutting section and a second feeding section is usually driven. The first feeding section feeds a long-formed rubber-coated steel cord in the longitudinal direction. The cutting section cuts the rubber-coated steel cord delivered from the first feeding section at a cutting angle giving a predetermined angle with respect to the longitudinal direction of the rubber-coated steel cord, thereby forming a cord piece in a parallelogram shape. The second feeding section feeds the cord piece in a direction intersecting obliquely with the feeding direction of the first feeding section at the same angle as the cutting angle. In other words, in the feeding apparatus, the rubber-coated steel cord is delivered on the second feeding section by the first feeding section, the delivered rubber-coated steel cord is cut by the cutting section into cord pieces, and the cord pieces placed on the second feeding section are carried out. Then, end portions of a plurality of cord pieces carried out from the second feeding section different in the cut surface cut by the cutting section are abutted against the other end portions thereof, which are coupled together to form a carcass cord or a breaker cord.

For example, the Japanese Patent No. 2923066 has disclosed a cutting/coupling apparatus for rubber-coated steel cords in which cord pieces are continuously delivered by the above feeding apparatus and the trailing end of a preceding cord piece is coupled with the leading end of a subsequent cord piece by the coupling apparatus. The cutting/coupling apparatus includes a carrying-in conveyor for carrying in cord pieces, a carrying-out conveyor for carrying out the cord pieces and a coupling unit for coupling the cord pieces.

As shown in FIG. 4A, in the feeding apparatus disclosed in the above Patent Document, a rubber-coated steel sheet 102 is delivered from a first feeding section (not illustrated) to a second feeding section 100 which is in a resting state, thereby the leading end of the rubber coated steel cord 102 is more likely to be caught by the second feeding section 100 due to frictional resistance or the like generated between the rubber coated steel sheet 102 and the second feeding section 100, as delivered in an increased quantity. As a result, a problem is posed that the delivered rubber coated steel sheet 102 buckles as shown in FIG. 4B or the leading end of the rubber coated steel sheet 102 gets snagged, as shown in FIG. 4C. In particular, there is a problem that the leading end of the rubber coated steel sheet 102 is made sharper as the cutting angle is made smaller, by which the leading end of the rubber-coated steel sheet 102 is more likely to be caught by the second feeding section.

The present invention has been made in view of the above situation, an object of which is to provide a feeding apparatus capable of preventing accidental delivery of long-formed sheets and carrying out the long-formed sheets satisfactorily.

SUMMARY OF THE INVENTION

The feeding apparatus of the present invention is provided with a first feeding section for feeding a long-formed sheet in the longitudinal direction of the sheet, a second feeding section for feeding the long-formed sheet delivered from the first feeding section in a direction intersecting obliquely with the feeding direction of the first feeding section, and a control section for controlling the first feeding section and the second feeding section so that the second feeding section starts to operate before the leading end of the long-formed sheet delivered from the first feeding section is in contact with the second feeding section.

In the feeding apparatus of the present invention, the control section may operate the second feeding section at a speed greater than the feeding directional component of the second feeding section included in the delivery speed of the first feeding section.

In the feeding apparatus of the present invention, the control section may start to operate from the second feeding section and then the first feeding section under the condition that the cut sheet pieces have all been carried out from the second feeding section to a carrying out section located downstream in the feeding direction of the second feeding section.

The feeding apparatus of the present invention may be additionally provided with a cutting section for cutting the long-formed sheet delivered from the first feeding section. It is preferable that the control section operates the second feeding section in such a manner that after the long-formed sheet is cut, the cut sheet pieces are carried out to a carrying out section located downstream in the feeding direction of the second feeding section. It is noted that there is a case where the second feeding section is driven in the same direction as the direction at which the sheet pieces are received and a case where it is driven in a reverse direction to a direction at which the sheet pieces are received. In both cases, the carrying out section is arranged downstream in the feeding direction of the second feeding section.

The method for controlling the feeding apparatus of the present invention is a method for controlling a feeding apparatus which is provided with a first feeding section for feeding a long-formed sheet in the longitudinal direction of the sheet and a second feeding section for feeding the long-formed sheet delivered from the first feeding section in a direction intersecting obliquely with the feeding direction of the first feeding section. In the method for controlling the feeding apparatus, the second feeding section is started for operation before the leading end of the long-formed sheet delivered from the first feeding section is in contact with the second feeding section.

According to the present invention, when the leading end of the long-formed sheet is in contact with the second feeding section, a relative speed of the second feeding section with respect to a speed of the feeding directional component of the second feeding section included in the delivery speed of the long-formed sheet is made smaller than when the second feeding section is in a resting state. Therefore, the leading end of the long-formed sheet is less likely to be caught by the second feeding section. Specifically, the long-formed sheet is less likely to have accidental delivery such as buckling of the long-formed sheet and snagging of the leading end of the long-formed sheet. As a result, the long-formed sheet can be carried out smoothly.

According to the present invention, when the leading end of the long-formed sheet is in contact with the second feeding section, the second feeding section slides in a feeding direction with respect to the leading end of the long-formed sheet, thereby the leading end of the long-formed sheet is not caught by the second feeding section. Thus, accidental delivery of the long-formed sheet is less likely to take place.

According to the present invention, since the second feeding section is not started for operation in a state that sheet pieces are placed on the second feeding section, it is possible to reliably receive subsequent sheet pieces.

According to the present invention, even where the carrying out section is arranged in front of the feeding direction of the second feeding section on receipt of sheet pieces or arranged behind the feeding direction of the second feeding section, the sheet pieces are carried out from the second feeding section toward the carrying out section. Therefore, the sheet pieces can be delivered in any necessary direction, according to various layouts of the feeding apparatus.

PREFERRED EMBODIMENTS

First Embodiment

Figure 1:
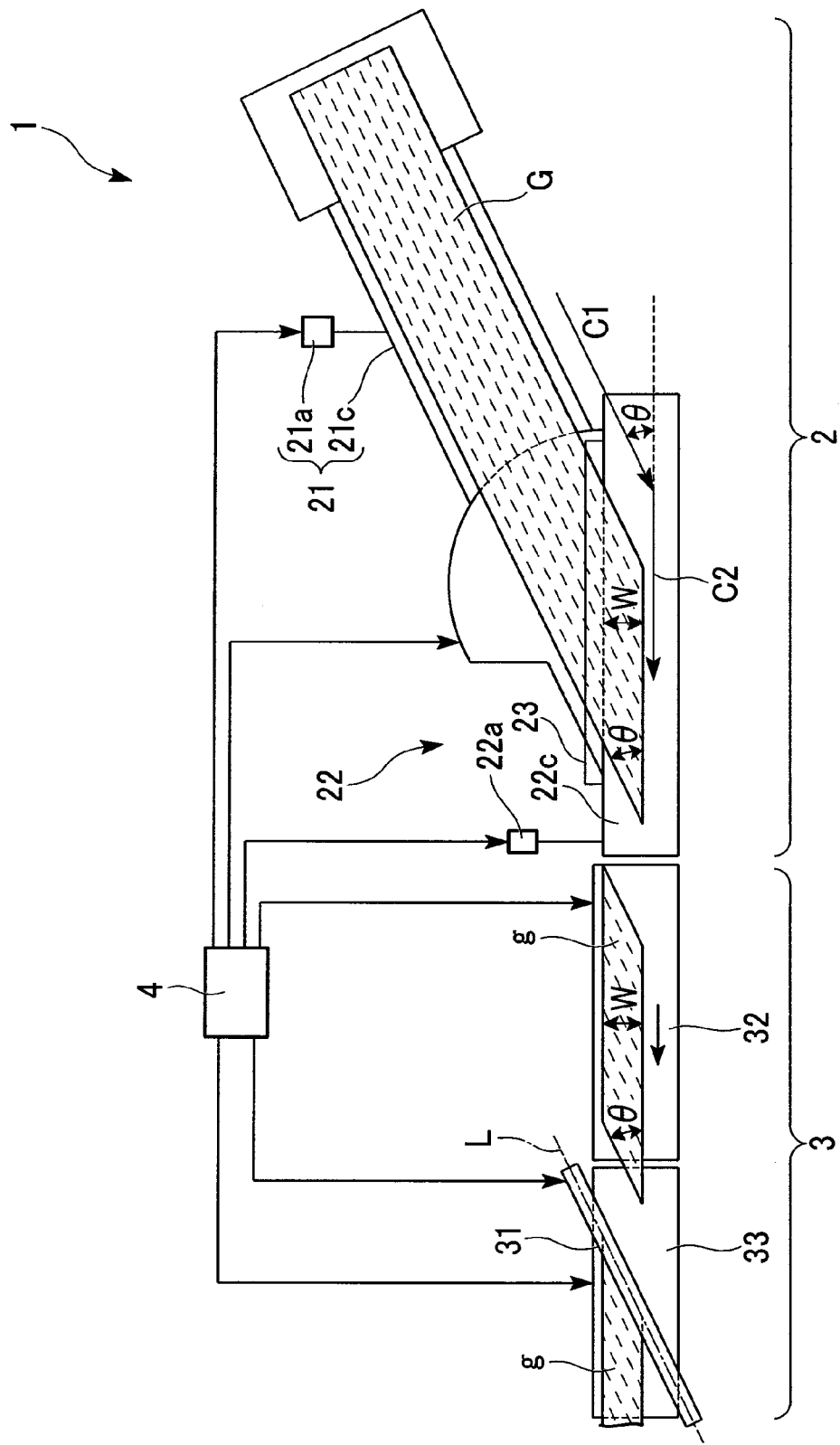
FIG. 1 is a plan view showing a first embodiment of facilities for producing a carcass cord of tires of the present invention.
Figure 2:
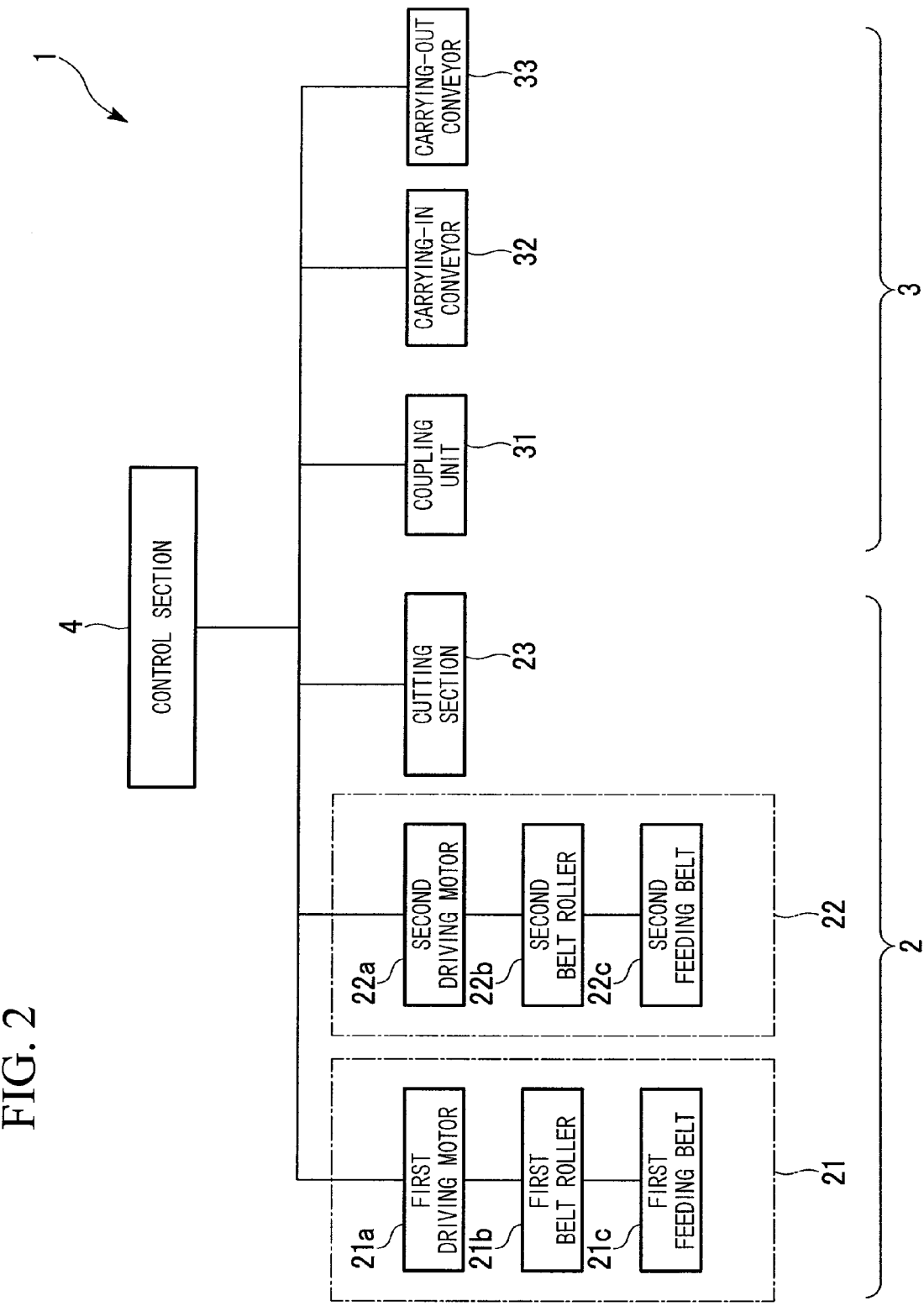
FIG. 2 is a block diagram of the control of the production facilities in the present invention.

FIG. 1 is a plan view showing the production facilities 1 of a carcass cord of tires in the first embodiment of the present invention. FIG. 2 is a block diagram of the control the production facilities 1. The production facilities 1 mainly includes a feeding apparatus 2, a coupling apparatus 3, and a control section 4 for controlling them. The production facilities 1 will be briefly described. As shown in FIG. 1, the feeding apparatus 2 cuts a long-formed rubber-coated steel cord (long-formed sheet) G during the feeding process to form cord pieces (sheet pieces) g, thereby carrying out the cord pieces g continuously to the coupling apparatus 3. Then, the coupling apparatus 3 couples the trailing end of a preceding cord piece g with the leading end of a subsequent cord piece g to form a carcass cord.

As shown in FIG. 1 and FIG. 2, the feeding apparatus 2 is provided with a first feeding section 21, a second feeding section 22 and a cutting section 23.

The first feeding section 21 feeds the long-formed rubber-coated steel cord G in the longitudinal direction of the cord G and delivers the cord G on the second feeding section 22 (a feeding direction of the first feeding section 21 is defined as "first feeding direction C1"). The first feeding section 21 is provided with a first feeding belt 21c, a first belt roller 21b around which the first feeding belt 21c is wound and a first driving motor 12a for driving the first belt roller 21b. The first driving motor 21a is controlled by the control section 4. When power is supplied to the first driving motor 21a, the first belt roller 21b is driven to rotate the first feeding belt 21c which is wound around the roller.

The second feeding section 22 feeds the rubber-coated steel cord G (cord pieces g) cut by the cutting section 23 in the longitudinal direction of the cord G and carries out the cord pieces g to the coupling apparatus 3 (a feeding direction of the second feeding section 22 is defined as "second feeding direction C2"). The second feeding section 22 is provided with a second feeding belt 22c, a second belt roller 22b around which the second feeding belt 22c is wound and a second driving motor 22a for driving the second belt roller 22b.

The second feeding belt 22c and the second belt roller 22b are arranged so that the longitudinal direction of the second feeding belt 22c intersects obliquely with the feeding direction C1 of the first feeding section 21.

The second driving motor 22a is controlled by the control section 4, as with the first driving motor 21a. When power is supplied to the second driving motor 22a, the second belt roller 22b is driven to rotate the second feeding belt 22c which is wound around the roller.

As shown in FIG. 1, an obtuse angle is made by the feeding direction C1 of the steel cord G along the feeding route of the first feeding section 21 and the feeding direction C2 of the cord piece g along the feeding route of the second feeding section 22. In this case, an acute angle made by the first feeding direction C1 and the second feeding direction C2 is defined as a feeding angle θ.

As shown in FIG. 1, the cutting section 23 cuts the rubber-coated steel cord G along the second feeding direction C2, when the width of the rubber-coated steel cord G (a length in a direction orthogonal to the second feeding direction C2) W delivered on the second feeding section 22 from the first feeding section 21 is given a predetermined dimension. In other words, since the rubber-coated steel cord G is fed on the second feeding section 22 at a feeding angle θ with respect to the second feeding direction C2, when the rubber-coated steel cord G is cut along the second feeding direction C2, the cut cord piece g is formed in a parallelogram where two opposing angles are both at the same angle as the feeding angle θ. The cord piece g is placed on the second feeding belt 22c and fed in the second feeding direction C2.

The coupling apparatus 3 is provided with a coupling unit 31, a carrying-in conveyor (carrying-out section) 32 and a carrying-out conveyor 33.

The coupling unit 31 includes a plurality of coupling rolls, coupling the trailing end of a preceding cord piece g with the leading end of a subsequent cord piece g at a position of a coupling line L. It is noted that the coupling line L is inclined at angle θ with respect to the second feeding direction C2.

The carrying-in conveyor 32 is arranged adjacent to the second feeding section 22, feeding the cord piece g in the second feeding direction C2 up to a position at which the leading end of the cord piece g carried out from the second feeding section 22 coincides with the coupling line L of the coupling unit 31.

The carrying-out conveyor 33 is arranged adjacent to the carrying-in conveyor 32, carrying out the cord piece g coupled by the coupling unit 31 in the second feeding direction C2.

The control section 4 controls all motions of the production facilities 1. Specifically, it controls the first feeding section 21, the second feeding section 22 and the cutting section 23, thereby continuously carrying out the cord pieces g to the coupling apparatus 3 at predetermined intervals. It also controls the coupling unit 31, the carrying-in conveyor 32 and the carrying-out conveyor 33, thereby coupling a preceding cord piece g with a subsequent cord piece g.

Further, the control section 4 controls the first feeding section 21 and the second feeding section 22 in such a manner that the second feeding section 22 is started for operation before the leading end of the rubber-coated steel cord G delivered from the first feeding section 21 is in contact with the second feeding belt 22c of the second feeding section 22. Specifically, the feeding apparatus 22 and the first feeding section 21 are driven in this order under the condition that preceding cord pieces g have been completely carried out to the carrying-in conveyor 32.

Further, the control section 4 controls the second feeding section 22 so that when the second feeding belt 22c is driven, the second feeding section 22 is driven at a speed equal to a speed component in the second feeding direction C2 included in a speed at which the rubber-coated steel cord G is delivered from the first feeding section 21 (delivery speed) or at a slightly faster speed. Specifically, the second driving motor 22a is driven in such a manner that a feeding speed of the second feeding belt 22c is in excess of the speed component in the second feeding direction C2 included in the delivery speed of the rubber-coated steel cord G.

It is noted that the speed of the second feeding belt 22c is preferably set to impart an appropriate tensile force so that the rubber-coated steel cord G will not be slackened due to a difference in speed with respect to the speed component in the second feeding direction C2 included in the delivery speed of the rubber-coated steel cord G.

Subsequently, an explanation will be made for processes of producing a carcass cord of tires in the above production facilities 1. It is noted that the following explanation will be made from a state that the rubber-coated steel cord G has been delivered on the second feeding section 22 only by a predetermined feeding width and the first feeding section 21 is halted as shown in FIG. 1.

First, the control section 4 supplies power to the first driving motor 21a to drive the first feeding belt 21c. The rubber-coated steel cord G is delivered by the first feeding belt 21c in the first feeding direction C1. Then, the rubber-coated steel cord G is cut by the cutting section 23 along the second feeding direction C2 of the second feeding section 22 under the condition that the width W of the rubber-coated steel cord G delivered on the second feeding belt 22c is given a predetermined dimension. The cut rubber-coated steel cord G, that is, a cord piece g, is placed on the second feeding belt 22c of the second feeding section 22.

The cord piece g is delivered by the second feeding belt 22c in the second feeding direction C2 and placed on the carrying-in conveyor 32. In this case, the control section 4 temporarily halts the operation of the second feeding section 22 under the condition that the cord piece g has been completely delivered to the carrying-in conveyor 32.

Thereafter, the cord piece g is fed by the carrying-in conveyor 32 to the carrying-out conveyor 33, and fed subsequently by the carrying-out conveyor 33 to a position at which the trailing end edge portion of the cord piece g coincides with the coupling line L.

The control section 4 supplies power to the second driving motor 22a under the condition that the cord piece g has been completely delivered to the carrying-in conveyor 32, thereby driving the second feeding belt 22c in the second feeding direction C2. In this case, the feeding speed of the second feeding belt 22c is in excess of the speed component in the second feeding direction C2 included in the delivery speed of the rubber-coated steel cord G by the first feeding belt 21c.

After driving the second feeding belt 22c, the control section 4 supplies power to the first driving motor 21a, thereby driving the first feeding belt 21c. The rubber-coated steel cord G is delivered toward the second feeding belt 22c at a constant speed. Then, when the rubber-coated steel cord G is delivered on the second feeding belt 22c, the leading end of the rubber-coated steel cord G is in contact with the second feeding belt 22c, by which the second feeding belt 22c slides in the second feeding direction C2 with respect to the leading end of the rubber-coated steel cord G.

Under the condition that the width W of the rubber-coated steel cord G delivered on the second feeding belt 22c is given a predetermined dimension, the rubber-coated steel cord G is cut by the cutting section 23. The cut rubber-coated steel cord G, that is, another cord piece g, is placed on the second feeding belt 22c of the second feeding section 22. During the cutting process, the control section 4 temporarily halts the operations of the first feeding section 21 and the second feeding section 22.

Next, the control section 4 again drives the second feeding belt 22c. Cord pieces g on the second feeding belt 22c are delivered by the second feeding belt 22c in the second feeding direction C2 and placed on the carrying-in conveyor 32. Further, the control section 4 drives the carrying-in conveyor 32, thereby feeding the cord piece g to a position at which the leading end edge portion of the cord piece g coincides with the coupling line L.

Thereafter, the coupling unit 31 couples the leading end edge portion of a subsequent cord piece g with the trailing end edge portion of a preceding cord piece g. The above motions are repeated a predetermined number of times, by which a plurality of cord pieces g are coupled in a band form to produce a carcass cord of a tire.

As described above, according to the present feeding apparatus 2, since the second feeding belt 22c of the second feeding section 22 slides in the feeding direction C2 with respect to the leading end of the rubber-coated steel cord G, the leading end of the rubber-coated steel cord G is not caught by the second feeding belt 22c. Therefore, the rubber-coated steel cord G is less likely to have accidental delivery, and the rubber-coated steel cord G can be carried out smoothly.

Second Embodiment

Figure 3:
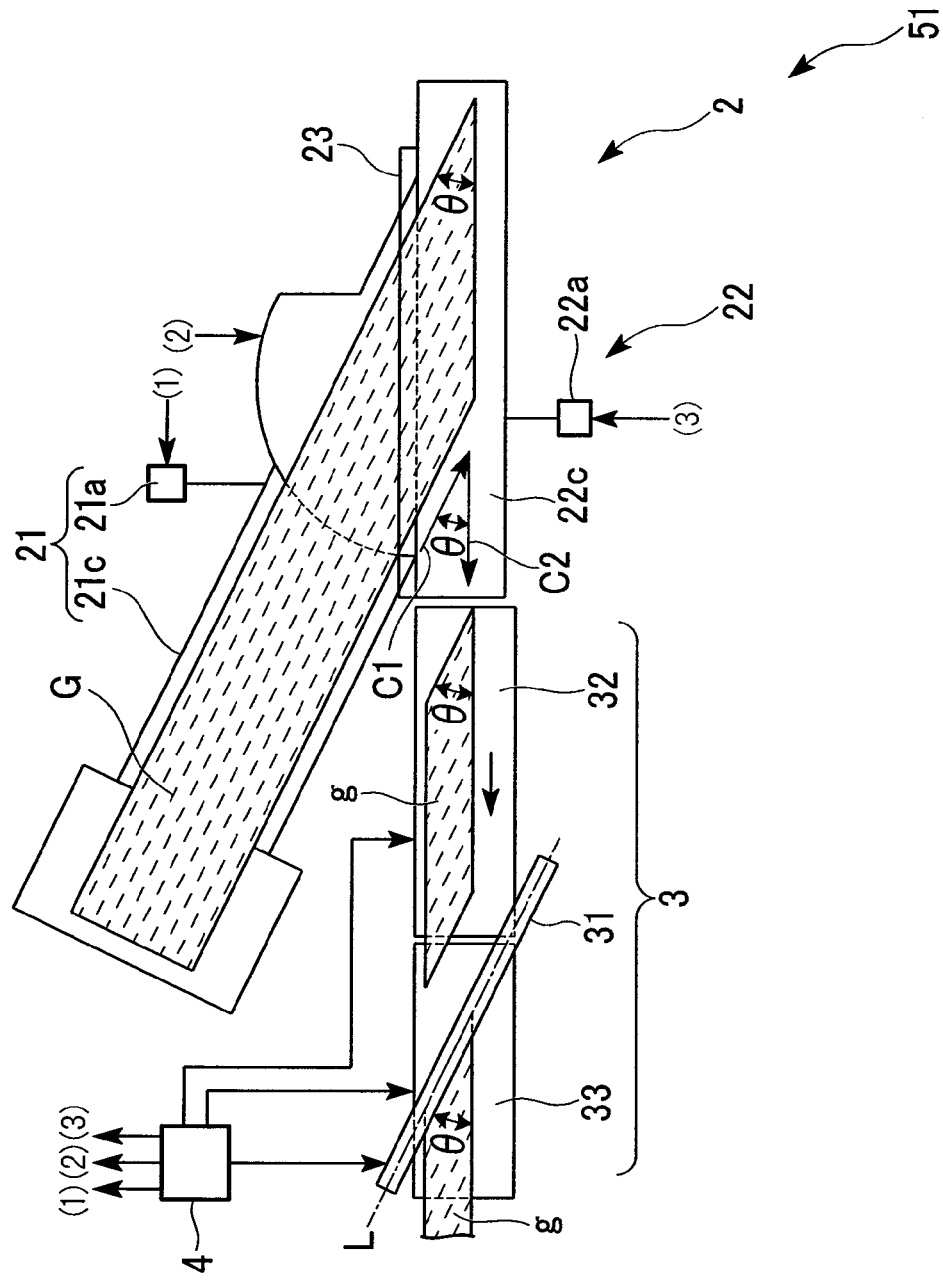
FIG. 3 is a plan view showing a second embodiment of faculties for producing the carcass cord of tires of the present invention.
Figure 4A:
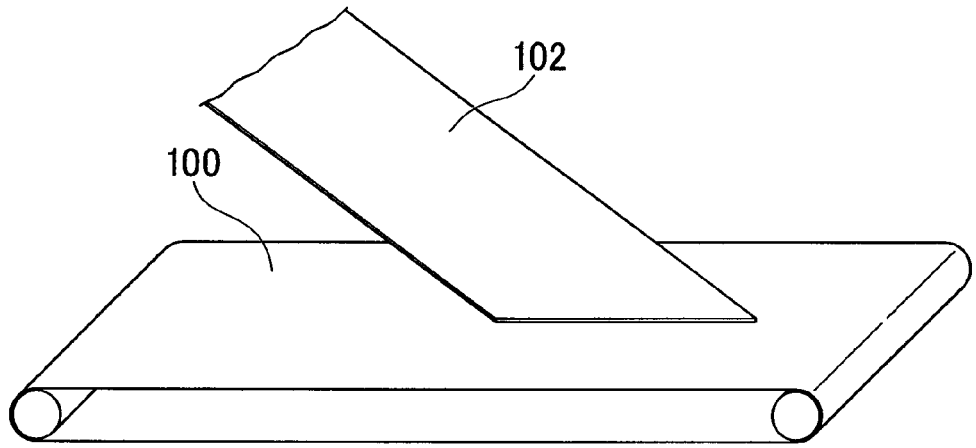
FIG. 4A to FIG. 4C are drawings showing a conventional feeding apparatus.
Figure 4B:
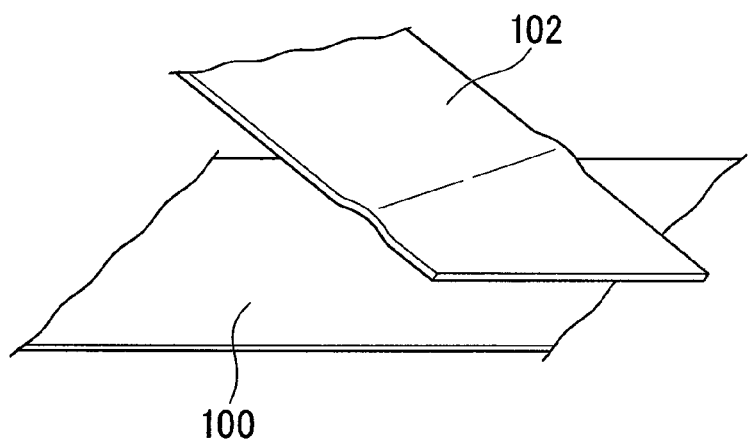
Figure 4C:
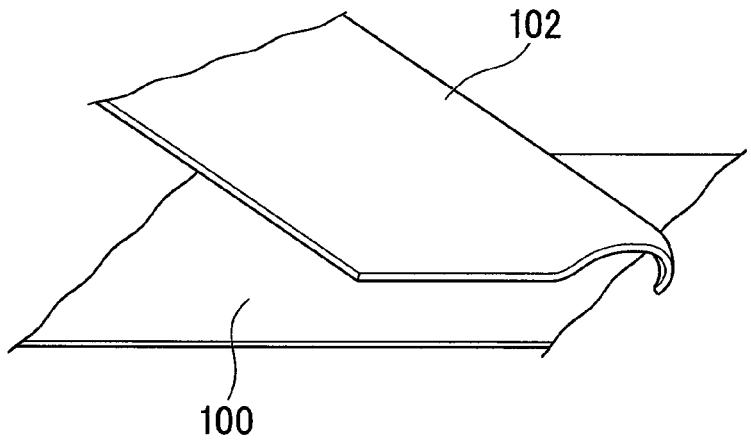

Subsequently, an explanation will be given for production facilities 51 for a carcass cord of tires in a second embodiment of the present invention. FIG. 3 is a plan view showing the production facilities 51. The same constituents as those described in FIG. 1 and FIG. 2 are given the same symbols or numerals, the explanation of which will be omitted here.

As shown in FIG. 3, in the production facilities 51, the first feeding section 21 is arranged differently from that arranged in the first embodiment of the production facilities 1. Specifically, the first feeding section 21 is arranged at a position which is in line symmetry with respect to a virtual line orthogonal to the second feeding direction C2 of the second feeding section 22. In other words, an acute angle is made by the first feeding direction C1 of the steel cord G along the feeding route of the first feeding section 21 and the second feeding direction C2 of the cord piece g along the feeding route of the second feeding section 22. However, the feeding direction C2 of the cord piece g from the second feeding section 22 to the carrying-in conveyor 32 is opposite to that in the production facilities 1 of the above first embodiment.

Further, the control section 4 operates the second driving motor 22a so that it rotates reversely until the rubber-coated steel cord G delivered on the second feeding section 22 is cut, thereby driving the second feeding belt 22c in a direction opposite to the second feeding direction C2. After a cord piece g is placed on the second feeding belt 22c, the control section operates the second driving motor 22a so that it rotates normally to feed the cord piece g in the second feeding direction C2.

Subsequently, an explanation will be given for processes of producing a carcass cord of tires by using the production facilities 51. In the following explanation, an explanation will be given for a process after the trailing end edge portion of a preceding fed cord piece g is fed to a position at which it coincides with the coupling line L.

The control section 4 rotates reversely the second driving motor 22a to drive the second feeding belt 22c in a direction opposite to the second feeding direction C2 under the condition that the cord pieces g have been completely delivered to the carrying-in conveyor 32. In this case, the feeding speed of the second feeding belt 22c is in excess of the feeding directional component of the second feeding belt 22c included in the delivery speed of the rubber-coated steel cord G by the first feeding belt 21c.

After driving the second feeding belt 22c, the control section 4 operates the first feeding section 21, delivering the rubber-coated steel cord G to the second feeding belt 22c at a constant speed. Then, when the rubber-coated steel cord G is delivered on the second feeding belt 22c, the leading end of the rubber-coated steel cord G is in contact with the second feeding belt 22c, by which the second feeding belt 22c slides in the second feeding direction C2 with respect to the leading end of the rubber-coated steel cord G.

Under the condition that the width W of the rubber-coated steel cord G delivered on the second feeding belt 22c is given a predetermined dimension, the rubber-coated steel cord G is cut by the cutting section 23. During the cutting process, the control section 4 temporarily halts operations of the first feeding section 21 and the second feeding section 22.

Next, the control section 4 operates the second driving motor 22a so that it rotates normally to drive the second feeding belt 22c in the second feeding direction C2. A cord piece g on the second feeding belt 22c is delivered by the second feeding belt 22c in the second feeding direction C2 and placed on a carrying-in conveyor 32. Then, the control section 4 drives the carrying-in conveyor 32 to feed the cord piece g to a position at which the leading end edge portion of the cord piece g coincides with the coupling line L.

Thereafter, the leading end edge portion of a subsequent cord piece g is coupled with the trailing end edge portion of a preceding cord piece g by the coupling unit 31. The above motions are repeated at a predetermined number of times, by which a plurality of cord pieces g are coupled in a band form to produce a carcass cord of a tire.

As described above, according to the present feeding apparatus 2, which is different in arrangement of the first feeding section 21 from the production facilities 1 of the first embodiment, the same effect as that of the above-described embodiment can be obtained even where the feeding direction C2 of the cord pieces g from the second feeding section 22 to the carrying-in conveyor 32 is opposite to that described in the production facilities 1 of the first embodiment.

The motion procedures, various configurations of individual members, a combination thereof and others in the above described embodiments are only an example and may be changed in various ways, based on design requirements or the like, within the scope not departing from the gist of the present invention.

For example, in the first embodiment, before the first feeding section 21 delivers the rubber-coated steel cord G to the second feeding section 22, the second feeding belt 22c is driven in the second feeding direction C2. In contrast, in the second embodiment, the second feeding belt 22c is driven in a direction opposite to the second feeding direction C2 at the same timing. However, even after the rubber-coated steel cord G is delivered from the first feeding section 21, and before the leading end of the delivered rubber-coated steel cord G is in contact with the second feeding section 22, the same effect as that of the above embodiments can be obtained.

Further, in the above embodiments, the second feeding belt 22c is driven at a speed equal to the speed component in the second feeding direction C2 included in the speed at which the rubber-coated steel cord G is delivered from the first feeding section 21 or at a slightly faster speed. However, even at a speed lower than the speed equal to the speed component in the second feeding direction C2, the leading end of the rubber-coated steel cord G is less likely to be caught by the second feeding belt 22c, because there is a smaller difference between the feeding speed of the second feeding belt 22c and the speed of the feeding directional component of the rubber-coated steel cord G. Therefore, the rubber-coated steel cord G is less likely to have accidental delivery.

In the above embodiments, an explanation was made for a case where a belt conveyor was used in the first feeding section 21 and the second feeding section 22. In place of the belt conveyor, such a belt conveyer may be usable that has a plurality of narrow belts divided in the width direction. Such a roller conveyor also may be usable that many rollers are arranged along the feeding direction.

In the above-described embodiments, the present invention was applied to the feeding apparatus 2 of the rubber-coated steel cord G. The present invention may be applicable to any apparatus as long as it feeds long-formed sheets, in addition to the rubber-coated steel cord.

What is claimed is:

1. A feeding apparatus comprising:
   a first feeding section for feeding a long-formed sheet in a longitudinal direction of the sheet, said longitudinal direction defining a first feeding direction;
   a second feeding section for feeding the long-formed sheet delivered from the first feeding section in a second feeding direction intersecting obliquely with the first feeding direction of the first feeding section; and
   a control section for controlling the first feeding section and the second feeding section in such a manner that the second feeding section starts to operate at a delivery speed before the leading end of the long-formed sheet delivered from the first feeding section is in contact with the second feeding section,
   wherein the second feeding section is operated by the control section at a speed greater than the feeding directional component of the second feeding section included in the delivery speed of the first feeding section.

2. The feeding apparatus according to claim 1, wherein the control section starts to operate from the second feeding section and then the first feeding section under the condition that the cut sheet pieces have all been carried out from the second feeding section to a carrying out section located downstream in the second feeding direction of the second feeding section.

3. The feeding apparatus according to claim 1, further comprising a cutting section for cutting the long-formed sheets delivered from the first feeding section,
   wherein the control section operates the second feeding section in such a manner that after the long-formed sheet is cut, the cut sheet piece is carried out to a carrying out section located downstream in the second feeding direction of the second feeding section driven in the same direction as the direction at which the sheet piece is received.

4. The feeding apparatus according to claim 1, further comprising a cutting section for cutting the long-formed sheet delivered from the first feeding section, wherein the control section operates the second feeding section in such a manner that after the long-formed sheet is cut, the cut sheet piece is carried out to a carrying out section located downstream in the second feeding direction of the second feeding section driven in a direction opposite to a direction at which the sheet piece is received.

5. A method for controlling a feeding apparatus, said method comprising:

feeding a long-formed sheet in a longitudinal direction of the sheet by a first feeding section, said longitudinal direction defining a first feeding direction, and feeding the long-formed sheet delivered from the first feeding section by a second feeding section in a second feeding direction intersecting obliquely with the first feeding direction of the first feeding section, wherein the second feeding section is started at a delivery speed for operation before the leading end of the long-formed sheet delivered from the first feeding section is in contact with the second feeding section, and the second feeding section is operated at a speed greater than the feeding directional component of the second feeding section included in the delivery speed of the first feeding section.

* * * * *